May 1, 1928. 1,668,160
A. LINGNER
MIRROR ANTIGLARE SHIELD
Filed Nov. 5, 1926
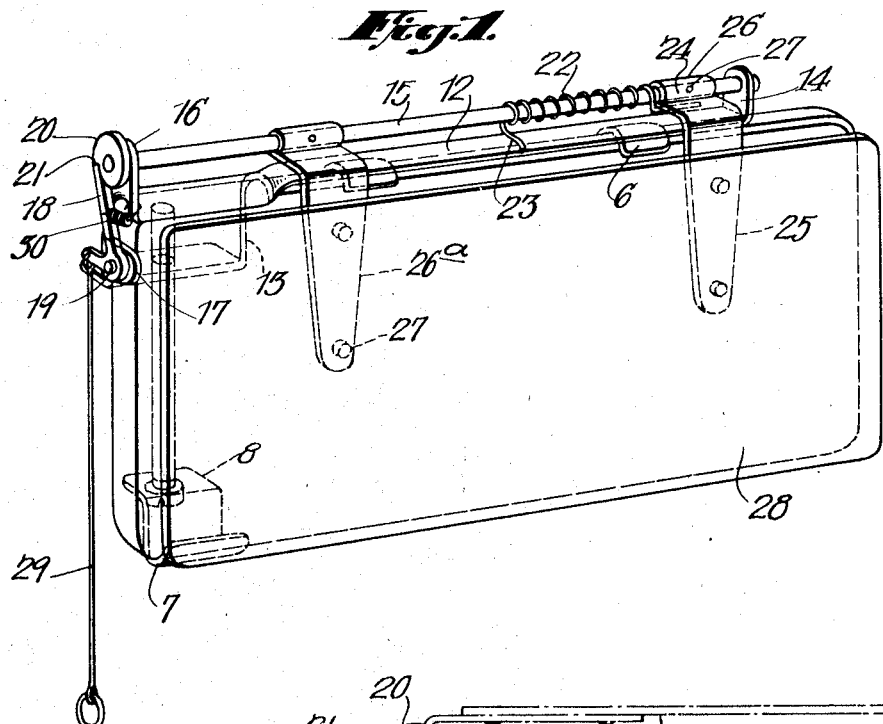
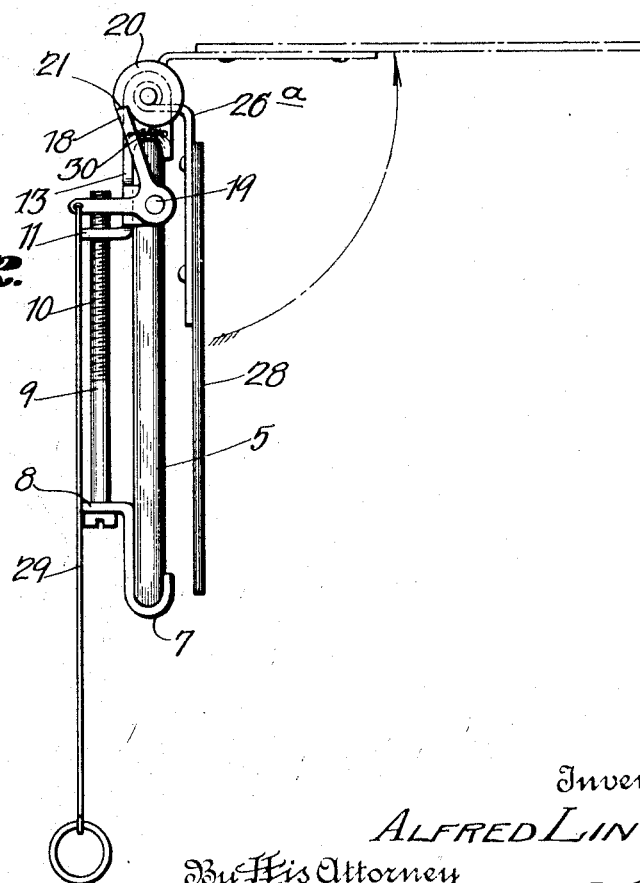
Inventor
ALFRED LINGNER.
By His Attorney
Richard R. Owen Patented May 1, 1928.

UNITED STATES PATENT OFFICE.

ALFRED LINGNER, OF NIAGARA FALLS, NEW YORK.

MIRROR ANTIGLARE SHIELD.

Application filed November 5, 1926. Serial No. 146,490.

This invention relates to mirror shields and in particular to one adapted to be positioned over the rear vision mirror in an automobile so that the driver may be protected from the glare of approaching headlights.

A particular object of the invention is to provide a mirror cover of some transparent or opaque substance which may be dropped into position over the mirror when a car approaching from the rear with bright headlights is reflected in the mirror and causes blindness of the driver of a vehicle.

A further object of the invention is to provide a simplified construction of mirror shield or cover which can be applied to any width or length of mirror without the necessity of cutting down the mirror or changing the construction through the medium of which the mirror is held in position in the frame of the automobile.

A still further object of the invention is to provide a simplified cover for a mirror which can be made of few parts, which can be manufactured cheaply and which can be attached without difficulty to any existing type of mirror in present day use in an automobile, it being of course understood that this shield will only be attached to rear vision mirrors to prevent the glare of headlights from vehicles approaching from the rear from blinding the driver.

To enable others skilled in the art to fully comprehend the underlying features of my invention that they may embody the same in the various modifications in structure and relation contemplated, a drawing depicting a preferred form has been annexed as a part of this disclosure and in such drawings, similar reference characters denote corresponding parts throughout all the views, of which Figure 1 is a view in perspective showing a mirror having positioned thereover my improved mirror cover, the working parts thereof being clearly shown, and Figure 2 is a view in end elevation of the mirror cover as illustrated in Figure 1, the position of the shield being shown in outline, when the same is not in use over the front face of the mirror.

Referring to the drawings in detail, 5 indicates a mirror whose edges may be bevelled, rounded or square, as desired, and as found in present day use. The mirror is held in position on any part of the frame of the cover of the car through the medium of suitable clamping jaws 6, illustrated in Figure 1, and which are connected in any manner, not shown, to any portion of the car above the driver's seat or at one side thereof, so that rear vision can be had through the mirror. These clamps 6 engage the upper edge of the mirror 5 and in conjunction with a lower clamp 7 hold the mirror in place wherever desired. In order to place my mirror cover in position on any mirror, it is necessary to allow for the present mirror construction in all its ramifications, which include mirrors of various sizes, as regards their width and length and in order to attain my object, I provide in the lower or corner bottom clamp 7, an outstruck lip portion 8 through which is passed a binding screw 9, the upper portion of which is threaded as at 10 and arranged to have threaded connection with the rearwardly extending flange portion 11 of the mirror and shield holder. This holder consists of an elongated strip 12 which may be formed to the contour of the upper edge of the mirror and extends therealong, one end of the holder being provided with a downwardly extending portion 13 from which the flange 11, before referred to, is formed. This portion from which the part 13 is formed, rests directly on top of the mirror edge but therebeyond it is raised so that it overlies the clamp jaws 6 and if desired, may rest on the upper surfaces thereof. The extreme end of the holder strip 12 is provided with an upturned lip 14 which forms a journal for one end of the shield carrying rod 15, the opposite end being journaled in a similar upstanding lip 16 formed at the opposite end of the mirror and shield holding strip 12. The part 13, hereinbefore referred to, is provided with an extended portion 17 in which is pivoted the bell crank 18, a pivot pin 19 being provided for this purpose and the projected portion 17 being bent around one end of the mirror so that the mirror may be positioned squarely within the mirror and shield holder, it being of course understood that when the threaded screw 9 is tightened up to draw the clamp 7 and the mirror holder strip 12 together, that the holder will be positioned as shown in Figure 1 on top of the mirror edge and will be forcibly held in position thereon. The outer end of the shield carrying rod 15 beyond the upstruck lip 16 carries a cam-like disk 20 which is provided with the notch 21 into which the end of the bell crank 18 is adapted to fit to prevent rotation of the disk 20 and consequently the shield carrying rod 15 in the direction in which it is normally urged by a coil spring 22 positioned about the rod 15 and having one of its free ends 23 pressing against the mirror holder 12 and its opposite free end 24 passing under a hinged arm 25. This hinged arm is provided with a sleeve portion 26 which fits closely about the rod 15 and is secured thereto through the medium of the pin 27.

The rod 15 carries in spaced relation to the hinge arm 25, a similar hinge arm 26ª and to both of these arms, there is secured through the medium of the rivet 27, or otherwise, the mirror shield 28, this shield being made of celluloid or other opaque material which can be cut to suit the size of the mirror in connection with which it is adapted to be used. This mirror shield is substantially the same size as the mirror and through its connection with the hinge arms 25 and 26ª is thrown up to the position shown in outline in Figure 2 when the bell crank 18 is drawn upon by the pull cord or rod 29 against the action of a coil spring 30 which is secured at one of its ends to the bell crank 18 and at the other end to the upstanding lip 16. It is evident that when the pull cord 29 or rod or chain, as the case may be, is drawn upon, the bell crank 18 is disengaged from the notch 21 in the disk 20 and the spring 22 surrounding the rod operates on the hinge arm 25 to raise the shield 28 to horizontal position, this horizontal position being limited by the position and temper of the spring. When it is desired to put the shield in position over the face of the mirror, the cover 28 is simply operated by the hand of the driver and drawn down to the position shown in full lines in Figure 2. This drawing down operation automatically revolving the disk 20 until the notch 21 therein engages the end of the bell crank 18, which is drawn into position in the notch by the spring 30.

It is evident therefore, that I have provided an efficient and useful mirror cover which can be instantly operated by the driver without disengagement of both hands from the steering wheel after a car has moved to a position where it does not cast the rays of its headlights on the mirror, it of course being understood that with the use of a green or colored, celluloid or other transparent shield, the headlights of the car could be seen but the glare would be eliminated. This shield could also be used in the daytime to eliminate the glare from the road being passed over, as the glare from an oiled road, is often uncomfortable to the driver of a car, due to the reflection of the rays of the sun on to the mirror.

It is also evident that I have provided a simplified construction of mirror cover which can be set up and used with any size of mirror and I have also provided a shield which may be cut and fitted to the shield holder to accommodate itself to any type of mirror in present day use.

It is also evident that I have provided a mirror and shield holding device in combination which will not require any change in the construction of the mirror holder and which will positively act and will not become worn nor its parts become displaced during operation or manipulation thereof.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:

1. A shield adapted for use with mirrors comprising shield carrying arms, a rod to which the arms are secured, a spring for causing rotation of the rod to raise the shield to uncover the mirror, a notched disk on the end of the rod, and a spring pressed latch for automatically engaging the notch when the shield is moved to its mirror covering position.

2. A shield adapted for use with mirrors comprising a shield carrying arm, a rod to which the arm is secured, a spring for causing rotation of the rod to raise the shield to uncover the mirror, a notched disk on the end of the rod, a spring pressed latch for automatically engaging the notch of the disk when the shield is moved to its mirror covering position, and a draw member for releasing the latch whereby the shield will automatically move to its mirror uncovering position.

3. A shield adapted to be used in conjunction with a mirror, comprising a non-reflecting member, a shield carrying rod, means for normally raising the shield to uncover the mirror, a movable catch to prevent raising of the shield until desired, and means for causing engagement of the catch when the shield is drawn down to cover the mirror.

4. In combination with a mirror shield device including a spring operated rod, control mechanism therefor consisting of a disk secured to the rod, a catch device associated with said disk and a pull element operatively connected to said catch device.

5. In combination a shield an operating rod therefor, spring actuated, a notched disk secured to the rod, a bell crank lever arranged to snap into engagement with the notch of the disk when the rod is moved to a predetermined position and a pull element connected to said bell crank.

6. In combination a mirror shield spring actuated means for automatically throwing the shield into inoperative position and control mechanism therefor consisting of a notch disk operatively associated with said means and a manually operated device associated with said disk to engage in a notch thereof for holding the shield against movement into an inoperative position by said means.

In testimony whereof I affix my signature.

ALFRED LINGNER. [L. S.]